Jan. 23, 1951  J. G. OETZEL  2,538,797
EDDY CURRENT DEVICE
Filed Jan. 24, 1949  3 Sheets-Sheet 1
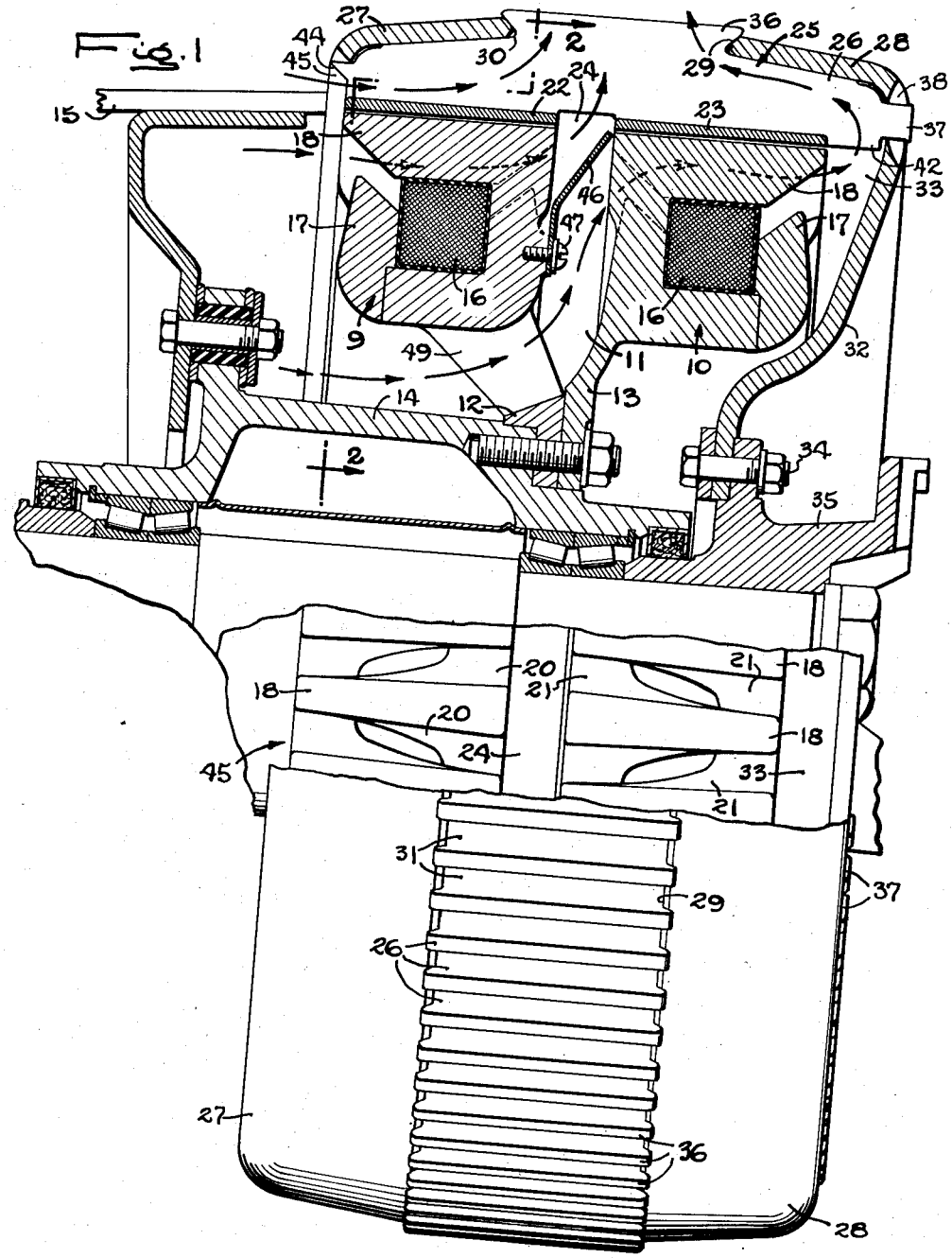
INVENTOR
John George Oetzel
By Carlson, Pitzner, Hatfield - Wolfe
ATTORNEYS

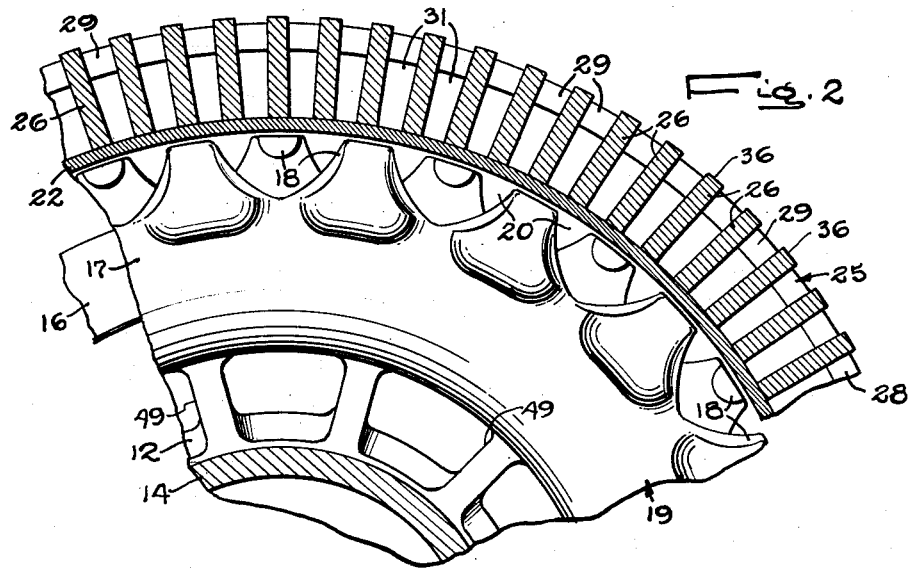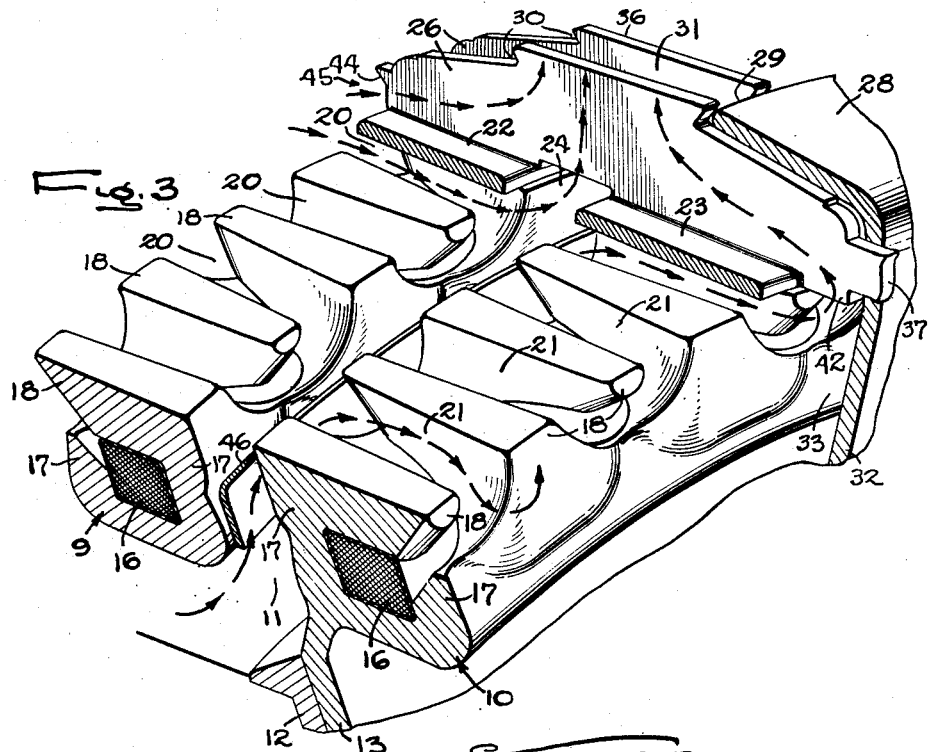

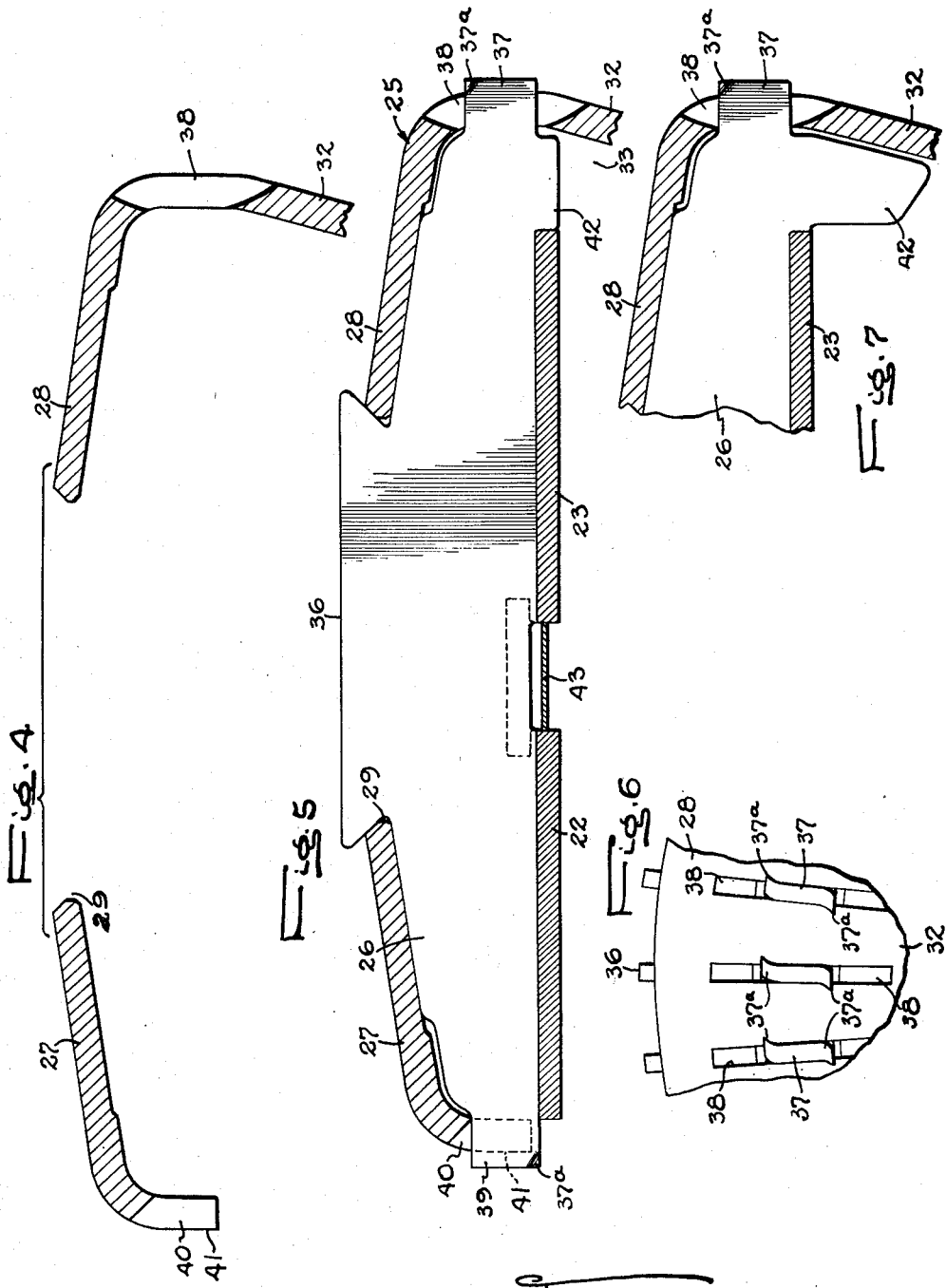

Patented Jan. 23, 1951

2,538,797

UNITED STATES PATENT OFFICE 2,538,797

EDDY CURRENT DEVICE

John George Oetzel, Beloit, Wis., assignor to Warner Electric Brake & Clutch Company, a corporation of Illinois Application January 24, 1949, Serial No. 72,332

12 Claims. (Cl. 172—285)

This invention relates to eddy current devices adapted for heavy duty, and more particularly to a device in which annularly arranged magnetic pole faces cooperate with a rotatable inductor carrying fan blades for inducing the flow of cooling air through the device.

One object is to provide a novel construction and arrangement of the fan blades and associated air channels for insuring efficient cooling of all parts of the eddy current inductor element.

Another object is to provide, in an eddy current device having a plurality of axially spaced magnet rings, a novel arrangement of fan blades and baffle elements for inducing the flow of air in a plurality of streams to cool the magnetic rings and inductor elements effectually and uniformly.

The invention also resides in the novel construction and arrangement of the parts for dividing and distributing the cooling air and for enabling the inductor element and fan parts to be made at low cost.

Other objects and advantages of the invention will become apparent from the following description taken in connection with the accompanying drawings, in which Figure 1 is an elevational view partly in section, of an eddy current device embodying the novel features of the present invention.

Fig. 2 is a fragmentary section taken along the line 2—2 of Fig. 1.

Fig. 3 is a fragmentary perspective view of the stator or field member illustrating the paths of the currents of cooling air.

Fig. 4 is a fragmentary sectional view of two of the fan parts.

Fig. 5 is a fragmentary sectional view similar to Fig. 1 showing the fan cage as assembled preparatory to uniting the parts thereof.

Fig. 6 is a fragmentary end view looking from the left in Fig. 1.

Fig. 7 is a fragmentary view similar to Fig. 1 showing a modified form of fan blade.

In the drawings, the invention is shown for purposes of illustration embodied in an eddy current device especially adapted for retarding heavy duty vehicles, and comprises two annular magnet rings 9 and 10 axially spaced apart to leave a narrow space 11 between them. At their adjacent ends, the magnets have inturned flanges 12 and 13 bolted to a nonrotatable sleeve 14 suitably mounted on the vehicle frame 15. Each magnet includes an annular coil 16 disposed between two axially spaced pole pieces 17 which terminate in axially tapered pole projections 18 which extend across the periphery of the magnet and alternate with each other so as to form air channels 20 across the outer periphery of the magnet 9 and similar channels 21 across the periphery of the magnet 10.

Concentric with the respective magnets are rotary inductor rings 22 and 23 which are coextensive with the pole faces of the respective magnets and axially separated by a space 24. The inductor rings are composed of soft iron, and the cylindrical inner surfaces thereof are disposed close to the outwardly facing surfaces of the pole projections 18 so as to form magnetic paths between the adjacent or oppositely polarized faces of each magnet.

Encircling the inductor rings 22 and 23 and carried thereby is a fan cage 25 which is constructed and arranged in a novel manner so as to induce air currents to flow not only through the rings and the magnet pole channels 20 and 21 but also axially inwardly toward each other and across opposite end portions of the rings on the exterior thereof. Herein, the fan includes radially disposed flat plates 26 extending across and rigidly secured to the inductor rings at annularly spaced intervals around the exterior of the latter. Opposite end portions of the blades are notched as indicated at 30 to receive rings 27 and 28 which are also brazed to the edges of the blades. Tongues 36 on the blades 26 thus separate the rings 27 and 28 which thus form outwardly opening holes 29 of substantial width and approximately centered relative to the two magnets. These holes constitute the outlets of axially extending channels 31 through which streams of air may enter from opposite ends of the cage 25 and flow toward each other and thence outwardly through the opening 29 as indicated by the arrows in Fig. 1.

The inductors and the fan cage form a rigid annulus which closely encircles the magnet poles and is supported from one end for rotation about the magnet axis. This is accomplished herein by forming the cage ring 28 as a flange on a disk 32 which is axially spaced from the outer side of the magnet 10 and cooperates with the latter to provide an outwardly opening annular passage 33. The inner portion of the disk is dished inwardly close to the magnet 10 and secured by bolts 34 to a rotatable part 35 of the vehicle.

To enable the fan cage to be made at low cost through the use of sheet metal stampings joined together by brazing, the blade notches 30 are made V-shaped to interlock with the edges of the rings 27 and 28, and one end of each blade 26 is formed with a lug 37 which projects through a slot 38 (Fig. 4) milled in the disk 32 adjacent the flange 28. A similar lug 39 formed on the other end of the blade projects through a slot 40 milled in an inturned flange 41 on the outer end of the ring 27. After assembly of the parts as shown in Fig. 5, the outer ends of the lugs 37 and 38 are peened over or otherwise crimped as indicated at 37ª to lock the rings 27 and 28 and the fan blades 26 firmly together. The inductor rings 22 and 23 are then inserted and held in proper axial positions by extensions 42 of the inner blade ends and by clips 43 disposed at annularly spaced points between the inductor rings 22 and 23. The parts of the assembly may then be copper brazed together, the blades becoming joined in intimate heat conducting relation with the inductor and cage rings along the inner and outer edges of the blades and at the sides of the lugs 37 and 38. Thereafter, the flange 41 and the lugs 38 are turned off to form a bevel surface 44 and thus provide axially facing inlet openings 45 of the desired radial width between the inductor ring 22 and the end of the flange 41.

In accordance with one aspect of the invention, the cage rings 27 and 28 are constructed and arranged in a novel manner to insure a flow of air in the proper volume inwardly between the rings and the inductors 22 and 23. To this end, the rings are tapered axially with the smaller ends disposed at the outer ends of the inductor rings 22 and 23 and the larger ends defining the sides of the central discharge outlets 29. Thus, the channels 31 between the adjacent fan blades are widened progressively and inwardly from opposite ends of the cage so that the air adjacent the outlet openings 29 is subjected to greater centrifugal force during rotation of the cage, thereby increasing the volume of air flowing inwardly from both ends of the cage. This efficient fan action is augmented by extending the tongues 36 of the blades outwardly through the opening between the rings 27 and 28.

The flow of air in the desired volume outwardly through the passages 33 and around the inner end of the inductor ring 23 is achieved in the present instance by extending the blade ends beyond the ring substantially to the disk 32 and also by providing the extensions 42 on the blades 26. These extensions project radially and inwardly past the edge of the ring 23 and thus increase the effective radial width of the fan blades at the outer ends of the passages 33.

Through the provision of the openings 24 and 33 at the center and inner ends of the cage 25, the fan above described is utilized not only to induce a flow of air across the outer surface of the inductor rings, but also across the inner surface of these rings and through the axially extending channels 20 and 21 between the adjacent poles of both magnets. For this purpose, baffle means is provided for directing air toward both of the fan inlets 24 and 33. Herein, the baffle comprises a sheet metal annulus 46 preferably of conical shape disposed between adjacent sides of the magnet 9 and 10 and secured as by screws 47 to the magnet 9. From a point adjacent the bottoms of the pole channels 20, the baffle is inclined outwardly with its free edge disposed close to the side of the magnet 10 and at the outermost edge thereof.

With the baffle thus arranged, the adjacent ends of the channels 20 and 21 of the two magnets are separated from each other, and the center inlet 24 of the fan is connected directly to the inner or outlet ends of the channels 20 between the pole pieces of the magnet 9. One stream of air thus enters the outer end of the inductor ring 22 and flows inwardly through the channels 20 and thence outwardly through the fan inlet 24. In a similar way, the inner end portion of the fan induces another stream of air to flow axially through the center hole in the magnet 9 and holes 49 between the spokes of the mounting flange 12. This stream then bends outwardly along the mounting flange 13 and between the two magnets and is diverted by the inner surface of the baffle 46 into the inlet ends of the channels 21 between the poles of the magnet 10. These poles and the inner surface of the inductor ring 23 are thus cooled by air which then flows outwardly through the passages 33 and then backwardly across the outer surface of the ring 23 to the fan outlet 29.

By properly sizing the three fan inlets 45, 24, and 33, the total volume of air delivered through the fan outlet 29 may be divided as desired between three separate paths shown by the arrows in Fig. 1. By dividing into two streams the air which cools the poles of the respective magnets and the inner surfaces of the associated inductor rings, the several streams traverse paths of minimum length which pass across all active parts of the eddy current device. As a result, the flow of air may be proportioned so that all parts which become heated directly or by conduction in the normal operation of the eddy current device are cooled effectually and substantially uniformly. The magnets may thus be worked at maximum capacity without danger of overheating or uneven heating.

If it is desired to increase the effectiveness of the fan in inducing air to flow through the magnet channels 21 along the longest of the three paths above referred to, the extensions 42 may be elongated radially as shown in Fig. 7. That is to say, these extensions may be projected farther inwardly and into the passages 33 thereby increasing the effective radial width of the fan blades beyond the inner end of the inductor ring 28. All or any part of the blades may be enlarged in this way.

This application is a continuation-in-part of my co-pending applications Serial No. 714,082, filed December 4, 1946, now abandoned, and Serial No. 714,395, filed December 6, 1946, now abandoned.

I claim as my invention:

1. An inductor for an eddy current device comprising a rotatably mounted conducting cylinder, fan blades secured to and extending across the exterior of said cylinder at points angularly spaced therearound, rings surrounding and secured to opposite end portions of said blades and axially spaced apart to define an air discharge opening, at least one of said rings being tapered and converging axially toward said opening, and a disk integral with the outer end of one of said rings and extending radially inwardly around the end of said cylinder to provide a passage through which air may flow from the interior of the cylinder outwardly around the cylinder end and thence axially across the outer end portion of said cylinder to said discharge opening.

2. An eddy current device having, in combination, axially separated ring magnets each having air channels extending axially across its periphery, two axially separated rotary inductor rings concentric with the respective magnets, fan blades extending across the exterior of said rings for inducing an outward flow of air therefrom, means supporting said blades and spaced from said rings to define outwardly opening passages at the remote ends of said inductor rings, and a baffle disposed between said magnets and operable to divert the air flowing through the channels of one magnet outwardly between said rings and to direct another part of the air through the channels of the other magnet and into one of said passages.

3. An eddy current brake having, in combination, axially separated ring magnets each having outwardly projecting pole pieces with transversely extending channels between adjacent pole pieces, axially spaced rotary inductors concentric with and overlapping the poles of the respective magnets, means carried by said inductor rings and operable to induce outward movement of air during rotation of said rings, and baffle means positioned between said magnets and operating to direct the flow of one air stream inwardly through the channels of one magnet outwardly between said rings and of a second air stream outwardly and through the channels of the other magnet.

4. An eddy current brake having, in combination, axially separated ring magnets, rotary axially separated inductor rings concentric with and cooperating with the respective magnets, fan elements carried on the outer periphery of said inductor rings to rotate therewith and to induce the flow of air in a stream outwardly from said rings, and baffle means acting on said stream to divide the same into a plurality of parts one moving axially across and between one magnet and its inductor ring, and then outwardly between the rings and a second part moving outwardly between said magnets, thence axially between and across the periphery of the other ring and its associated magnet and finally outwardly around the end of the latter ring.

5. An eddy current brake having, in combination, axially separated ring magnets, rotary axially separated inductor rings concentric with and cooperating with the respective magnets, means rotatable with the inductor rings to induce the flow of air in a stream outwardly from said rings, and baffle means dividing said air stream into two parts, one part moving axially between one magnet and its associated ring and thence outwardly between said two inductor rings and the other part moving axially between the other magnet and inductor ring and then outwardly around the remote end of the latter ring.

6. An eddy current device having, in combination, a pair of ring magnets axially separated to define an opening between them, each of said magnets having outwardly facing poles, a rotary inductor encircling said poles and providing an intermediate annular air inlet registering with said magnet opening, fan blades secured to and extending across the exterior of said inductor at points angularly spaced around the latter, a pair of rings rotatable with said inductor and enclosing said blades, said rings being axially spaced apart to form an air outlet, one ring cooperating with said inductor to provide a second annular air inlet at one end of the inductor, a supporting disk axially spaced beyond the other end of the inductor and cooperating with the latter and said other ring to form a third annular air inlet, and a baffle disposed in said opening and acting to deflect air flowing axially between the inductor and one of said magnets outwardly through said intermediate inlet and to divert air flowing axially through the latter magnet toward said third inlet through the space between said inductor and the other magnet.

7. An eddy current device having, in combination, first and second ring magnets axially separated to define an opennig between them, said first magnet being adapted for the flow of air axially therethrough to said opening, each of said magnets having outwardly facing poles, a rotary inductor encircling said poles and providing an annular air inlet registering with said magnet opening, fan blades secured to and extending across the exterior of said inductor at points angularly spaced around the latter, and baffle means disposed in said opening and operable to direct air flowing axially across the periphery of said first magnet outwardly through said inlet and also to direct the air flowing through the center of the first magnet axially into the space between the inductor and the second magnet.

8. An eddy current device having, in combination, a pair of ring magnets axially separated to define an opening between them, each of said magnets having outwardly facing pole pieces circumferentially spaced apart to define channels extending transversely across the magnet periphery, a rotary inductor encircling said pole pieces and channels and providing an intermediate air inlet registering with said magnet opening, fan blades secured to and extending across the exterior of said inductor at points angularly spaced around the latter, a pair of rings rotatable with said inductor and enclosing said blades, said rings being axially spaced apart to form an air outlet, one ring cooperating with said inductor to provide a second air inlet at one end of the inductor, means axially spaced beyond the other end of the inductor and cooperating with the latter and said other ring to form a third air inlet, and a baffle disposed in said opening and separating the adjacent ends of the magnet channels while directing air from the channels in one magnet outwardly through said intermediate inlet and directing air into the adjacent ends of the channels of the other magnet and toward said third inlet.

9. An eddy current inductor comprising a cylinder of conducting material, fan blades extending across and secured to the exterior of said cylinder at points angularly spaced therearound, lugs projecting from opposite ends of said blades beyond the ends of said cylinder, outwardly projecting tongues on the outer edges of said blades intermediate the ends thereof, axially spaced rings encircling opposite end portions of said blades and secured thereto with their adjacent edges abutting against the ends of said tongues, a disk rigid with the outer end of one of said rings and having slots therein receiving one of said blade lugs, and an inturned flange on the outer end of the other ring having slots therein receiving the other of said blade lugs.

10. An eddy current inductor comprising a cylinder of conducting material, fan blades extending across and secured to the exterior of said cylinder at points angularly spaced therearound, axially spaced rings encircling opposite end portions of said blades and secured thereto, abutments on said blades engageable with the adjacent edges of said rings to locate the rings, a disk rigid with the outer end of one of said rings and having slots therein alined with said blades, and lugs on the ends of said blades projecting through and secured in said slots.

11. An eddy current inductor comprising a cylinder of conducting material, fan blades extending across and secured to the exterior of said cylinder at points angularly spaced therearound, outwardly projecting tongues on the outer edges of said blades intermediate the ends thereof, and axially spaced rings encircling opposite end portions of said blades and secured thereto with their adjacent edges abutting against the ends of said tongues, said cylinder, said blades, and said ring forming a rigid fan unit.

12. An eddy current inductor comprising a cylinder of conducting material, fan blades extending across and secured to the exterior of said cylinder at points angularly spaced therearound, outwardly projecting tongues on the outer edges of said blades intermediate the ends thereof, a ring encircling one end portion of said blades and rigidly secured thereto, a supporting disk axially spaced from the other end of said cylinder and cooperating therewith to form an annular outwardly extending air passage leading to the adjacent ends of said blades, and a ring rigid with the outer periphery of said supporting disk and encircling the other end portion of said blades to extend said air passage axially around the end of said cylinder, said rings being spaced apart axially with the adjacent edges abutting against opposite ends of said tongues.

JOHN GEORGE OETZEL.

REFERENCES CITED

The following references are of record in the file of this patent:

UNITED STATES PATENTS

| Number | Name | Date |
|---|---|---|
| 2,167,487 | Moss | July 25, 1939 |
| 2,287,953 | Winther | June 30, 1942 |
| 2,393,211 | Winther | Jan. 15, 1946 |